US011996630B2

(12) United States Patent
Zhao et al.

(10) Patent No.: US 11,996,630 B2
(45) Date of Patent: May 28, 2024

(54) ANTENNA STRUCTURE

(71) Applicant: Quanta Computer Inc., Taoyuan (TW)

(72) Inventors: Yu-Chen Zhao, Taoyuan (TW); Chung-Ting Hung, Taoyuan (TW); Chin-Lung Tsai, Taoyuan (TW); Ying-Cong Deng, Taoyuan (TW); Kuan-Hsien Lee, Taoyuan (TW); Yi-Chih Lo, Taoyuan (TW); Kai-Hsiang Chang, Taoyuan (TW); Chun-I Cheng, Taoyuan (TW); Yan-Cheng Huang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 140 days.

(21) Appl. No.: 17/929,342

(22) Filed: Sep. 2, 2022

(65) Prior Publication Data

US 2024/0021988 A1 Jan. 18, 2024

(30) Foreign Application Priority Data

Jul. 13, 2022 (TW) ................................ 111126333

(51) Int. Cl.
*H01Q 5/30* (2015.01)
*H01Q 1/48* (2006.01)
(Continued)

(52) U.S. Cl.
CPC ................ *H01Q 5/30* (2015.01); *H01Q 1/48* (2013.01); *H01Q 5/25* (2015.01); *H01Q 5/50* (2015.01)

(58) Field of Classification Search
CPC H01Q 9/42; H01Q 1/243; H01Q 1/38; H01Q 5/30; H01Q 1/241; H01Q 1/242;
(Continued)

(56) References Cited

U.S. PATENT DOCUMENTS 7,911,405 B2 * 3/2011 Pascolini ................ H01Q 9/42 343/741
9,293,826 B2 * 3/2016 Yonei .................... H01Q 5/371
(Continued)

FOREIGN PATENT DOCUMENTS

CN 104412450 A 3/2015
TW 201628264 A 8/2016

OTHER PUBLICATIONS

Chinese language office action dated Feb. 24, 2023, issued in application No. TW 111126333.

*Primary Examiner* — Vibol Tan
(74) *Attorney, Agent, or Firm* — McClure, Qualey & Rodack, LLP

(57) ABSTRACT

An antenna structure includes a ground element, a first radiation element, a second radiation element, a third radiation element, and a nonconductive support element. The first radiation element is coupled to a first grounding point on the ground element. The second radiation element has a feeding point. The second radiation element is adjacent to the first radiation element. The third radiation element is coupled to a second grounding point on the ground element. The third radiation element is adjacent to the second radiation element. The first radiation element, the second radiation element, and the third radiation element are disposed on the nonconductive support element. The second radiation element is at least partially surrounded by the first radiation element. The third radiation element is at least partially surrounded by the second radiation element.

10 Claims, 2 Drawing Sheets

(51) Int. Cl.
*H01Q 5/25* (2015.01)
*H01Q 5/50* (2015.01)

(58) Field of Classification Search
CPC .......... H01Q 21/30; H01Q 5/50; H01Q 9/045; H01Q 5/25; H01Q 5/328; H01Q 5/357; H01Q 5/10; H01Q 1/48; H01Q 5/385
See application file for complete search history.

(56) References Cited

U.S. PATENT DOCUMENTS

| | | | | |
|---|---|---|---|---|
| 9,992,312 | B1 * | 6/2018 | Deng | H04Q 1/24 |
| 10,522,902 | B1 * | 12/2019 | Tseng | H01Q 1/48 |
| 11,196,175 | B2 * | 12/2021 | Sakamoto | H01Q 9/42 |
| 11,742,576 | B2 * | 8/2023 | Su | H01Q 1/48<br>343/848 |
| 11,784,397 | B1 * | 10/2023 | Lee | H01Q 9/42<br>343/718 |

* cited by examiner

ANTENNA STRUCTURE

CROSS REFERENCE TO RELATED APPLICATIONS

This application claims priority of Taiwan Patent Application No. 111126333 filed on Jul. 13, 2022, the entirety of which is incorporated by reference herein.

BACKGROUND OF THE INVENTION

Field of the Invention

The disclosure generally relates to an antenna structure, and more particularly, to a wideband antenna structure.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements for wireless communication. If an antenna for signal reception and transmission has insufficient operational bandwidth, it may degrade the communication quality of the relative mobile device. Accordingly, it has become a critical challenge for antenna designers to design a small-size, wideband antenna structure.

BRIEF SUMMARY OF THE INVENTION

In an exemplary embodiment, the invention is directed to an antenna structure that includes a ground element, a first radiation element, a second radiation element, a third radiation element, and a nonconductive support element. The first radiation element is coupled to a first grounding point on the ground element. The second radiation element has a feeding point. The second radiation element is adjacent to the first radiation element. The third radiation element is coupled to a second grounding point on the ground element. The third radiation element is adjacent to the second radiation element. The first radiation element, the second radiation element, and the third radiation element are disposed on the nonconductive support element. The second radiation element is at least partially surrounded by the first radiation element. The third radiation element is at least partially surrounded by the second radiation element.

In some embodiments, the second radiation element is substantially positioned between the first radiation element and the third radiation element.

In some embodiments, the first radiation element substantially has an L-shape and includes a wide portion and a narrow portion, and the narrow portion is coupled through the wide portion to the first grounding point.

In some embodiments, the second radiation element substantially has a meandering shape and further includes a first terminal widening portion.

In some embodiments, the third radiation element substantially has an inverted U-shape and further includes a second terminal widening portion.

In some embodiments, a first coupling gap is formed between the second radiation element and the first radiation element, and a second coupling gap is formed between the third radiation element and the second radiation element. The first coupling gap has a width of 0.5 mm to 3 mm. The second coupling gap has a width of 0.5 mm to 3 mm.

In some embodiments, the antenna structure covers a first frequency band, a second frequency band, and a third frequency band. The first frequency band is from 800 MHz to 860 MHz. The second frequency band is from 1710 MHz to 2170 MHz. The third frequency band is from 2500 MHz to 2690 MHz.

In some embodiments, the length of the first radiation element is substantially equal to 0.25 wavelength of the first frequency band.

In some embodiments, the length of the second radiation element is substantially equal to 0.25 wavelength of the second frequency band.

In some embodiments, the length of the third radiation element is substantially equal to 0.25 wavelength of the third frequency band.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
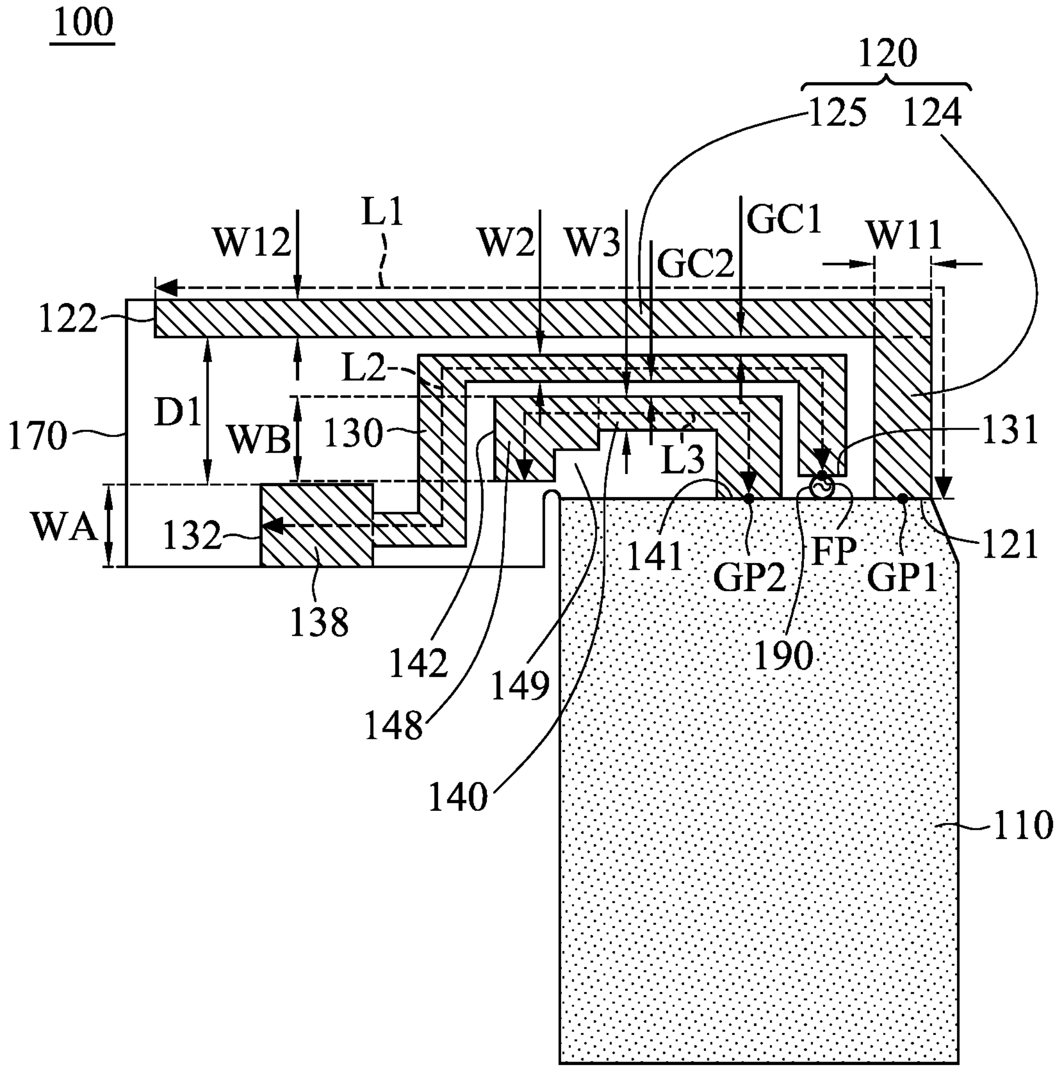
FIG. 1 is a diagram of an antenna structure according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a diagram of an antenna structure 100 according to an embodiment of the invention. For example, the antenna structure 100 may be applied to a mobile device, such as a smart phone, a tablet computer, a notebook computer, a wireless access point, a router, or any device with a communication function. Alternatively, the antenna structure 100 may be applied to an electronic device, such as any unit of IOT (Internet of Things).

In the embodiment of FIG. 1, the antenna structure 100 includes a ground element 110, a first radiation element 120, a second radiation element 130, a third radiation element 140, and a nonconductive support element 170. The ground element 110, the first radiation element 120, the second radiation element 130, and the third radiation element 140 may all be made of metal materials, such as copper, silver, aluminum, iron, or their alloys.

The ground element 110 may be implemented with a ground copper foil, which may provide a ground voltage. For example, the ground element 110 may be coupled to a system ground plane (not shown) of the antenna structure 100.

The first radiation element 120 may substantially have an L-shape. Specifically, the first radiation element 120 has a first end 121 and a second end 122. The first end 121 of the first radiation element 120 is coupled to a first grounding point GP1 on the ground element 110. The second end 122 of the first radiation element 120 is an open end. In some embodiments, the first radiation element 120 includes a wide portion 124 adjacent to the first end 121 and a narrow portion 125 adjacent to the second end 122. The narrow portion 125 is coupled through the wide portion 124 to the first grounding point GP1. It should be noted that the term "adjacent" or "close" over the disclosure means that the distance (spacing) between two corresponding elements is smaller than a predetermined distance (e.g., 10 mm or the shorter), or means that the two corresponding elements directly touch each other (i.e., the aforementioned distance/spacing between them is reduced to 0).

The second radiation element 130 may substantially have a meandering shape. The second radiation element 130 is at least partially surrounded by the first radiation element 120. In addition, the second radiation element 130 is adjacent to the first radiation element 120. A first coupling gap GC1 may be formed between the second radiation element 130 and the first radiation element 120. Specifically, the second radiation element 130 has a first end 131 and a second end 132. A feeding point FP is positioned at the first end 131 of the second radiation element 130. The second end 132 of the second radiation element 130 is an open end. The feeding point FP may be further coupled to a signal source 190. The signal source 190 may be an RF (Radio Frequency) module for exciting the antenna structure 100. For example, the second end 132 of the second radiation element 130 and the second end 122 of the first radiation element 120 may substantially extend in the same direction. In some embodiments, the second radiation element 130 further includes a first terminal widening portion 138, which is positioned at the second end 132 of the second radiation element 130. For example, the first terminal widening portion 138 of the second radiation element 130 may substantially have a rectangular shape, but it is not limited thereto. In alternative embodiments, the first terminal widening portion 138 of the second radiation element 130 substantially is modified to a circular shape, an elliptical shape, a triangular shape, or a trapezoidal shape.

The third radiation element 140 may substantially have an inverted U-shape. The third radiation element 140 is at least partially surrounded by the second radiation element 130. In addition, the third radiation element 140 is adjacent to the second radiation element 130. A second coupling gap GC2 is formed between the third radiation element 140 and the second radiation element 130. In some embodiments, the second radiation element 130 is substantially positioned between the first radiation element 120 and the third radiation element 140. Specifically, the third radiation element 140 has a first end 141 and a second end 142. The first end 141 of the third radiation element 140 is coupled to a second grounding point GP2 on the ground element 110. The second end 142 of the third radiation element 140 is an open end. For example, the second end 142 of the third radiation element 140 and the second end 122 of the first radiation element 120 may substantially extend in the same direction. The second grounding point GP2 may be different from the aforementioned first grounding point GP1. The feeding point FP may be substantially positioned between the first grounding point GP1 and the second grounding point GP2. In some embodiments, the third radiation element 140 further includes a second terminal widening portion 140, which is positioned at the second end 142 of the third radiation element 140. For example, the second terminal widening portion 148 of the third radiation element 140 may substantially have a square shape with a notch 149, but it is not limited thereto. In alternative embodiments, the second terminal widening portion 148 of the third radiation element 140 is modified to a circular shape, an elliptical shape, a triangular shape, or a trapezoidal shape.

The nonconductive support element 170 may be an FR4 (Flame Retardant 4) substrate, a PCB (Printed Circuit Board), or an FPC (Flexible Printed Circuit). The first radiation element 120, the second radiation element 130, and the third radiation element 140 may all be disposed on the same surface of the nonconductive support element 170, such that the antenna structure 100 may be a planar antenna structure. However, the invention is not limited thereto. In alternative embodiments, the first radiation element 120, the second radiation element 130, and the third radiation element 140 are disposed on different surfaces of the nonconductive support element 170, so as to form a 3D (Three-Dimensional) antenna structure.

Figure 2:
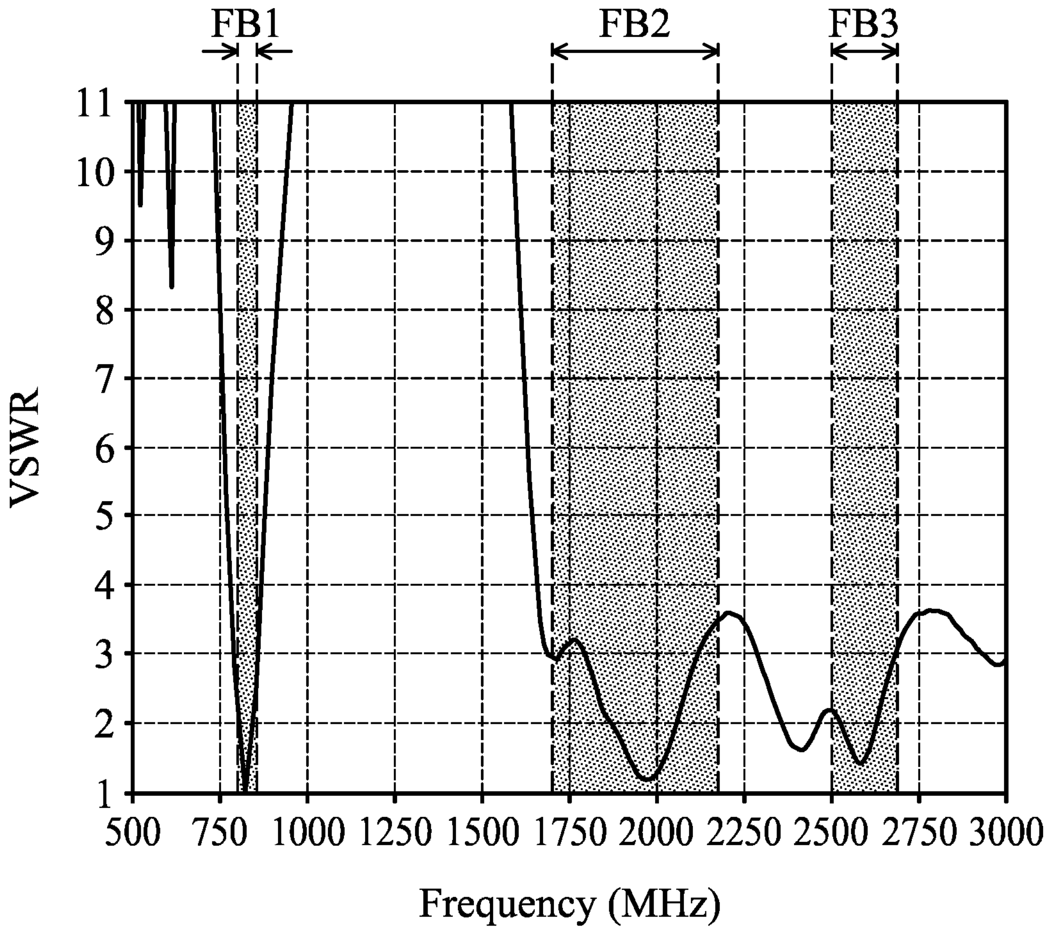
FIG. 2 is a diagram of VSWR (Voltage Standing Wave Ratio) of an antenna structure according to an embodiment of the invention.

FIG. 2 is a diagram of VSWR (Voltage Standing Wave Ratio) of the antenna structure 100 according to an embodiment of the invention. The horizontal axis represents the operational frequency (MHz), and the vertical axis represents the VSWR. According to the measurement of FIG. 2, the antenna structure 100 can cover a first frequency band FB1, a second frequency band FB2, and a third frequency band FB3. For example, the first frequency band FB1 may be from 800 MHz to 860 MHz, the second frequency band FB2 may be from 1710 MHz to 2170 MHz, and the third frequency band FB3 may be from 2500 MHz to 2690 MHz. Therefore, the antenna structure 100 can support at least the wideband operations of LTE (Long Term Evolution).

In some embodiments, the operational principles of the antenna structure 100 will be described as follows. The second radiation element 130 is independently excited to generate the second frequency band FB2. The first radiation element 120 is excited by the second radiation element 130 using a coupling mechanism, so as to form the first frequency band FB1. The third radiation element 140 is excited by the second radiation element 130 using another coupling mechanism, so as to form the third frequency band FB3. According to practical measurements, the first terminal widening portion 138 of the second radiation element 130 is configured to fine-tune the impedance matching of the first frequency band FB1. Also, the second terminal widening portion 148 of the third radiation element 140 is configured to fine-tune the impedance matching of the second frequency band FB2 and the third frequency band FB3. It should be noted that the whole size of the antenna structure 100 can be effectively reduced since all radiation elements corresponding to the LTE communication are integrated in the single antenna structure 100.

In some embodiments, the element sizes of the antenna structure 100 will be described as follows. The length L1 of the first radiation element 120 may be substantially equal to 0.25 wavelength (λ/4) of the first frequency band FB1 of the antenna structure 100. In the first radiation element 120, the width W11 of the wide portion 124 may be from 3.5 mm to 4.5 mm, and the width W12 of the narrow portion 125 may be from 2.5 mm to 3.5 mm. The length L2 of the second radiation element 130 may be substantially equal to 0.25 wavelength (λ/4) of the second frequency band FB2 of the antenna structure 100. The width WA of the first terminal widening portion 138 of the second radiation element 130 may be from 5 mm to 7 mm. The width W2 of the other portions of the second radiation element 130 may be from 1 mm to 3 mm. The width WB of the second terminal widening portion 148 of the third radiation element 140 may be from 5 mm to 8 mm. The width W3 of the other portions of the third radiation element 140 may be from 1 mm to 3 mm. The width of the first coupling gap GC1 may be from 0.5 mm to 3 mm. The width of the second coupling gap GC2 may be from 0.5 mm to 3 mm. The distance D1 between the first terminal widening portion 138 of the second radiation element 130 and the second end 122 of the first radiation element 120 may be from 10 mm to 13 mm. The above ranges of element sizes and parameters are calculated and obtained according to many experiment results, and they help to optimize the operational bandwidth and impedance matching of the antenna structure 100.

In some embodiments, the aforementioned antenna structure 100 is applied in a POS (Point of Sale) system (not shown). Since the POS system includes the aforementioned antenna structure 100, the POS system can support the function of wireless communication. In some embodiments, the POS system further includes an RF circuit, a filter, an amplifier, a processor, and/or a housing, but it is not limited thereto.

The invention proposes a novel antenna structure. In comparison to the conventional design, the invention has at least the advantages of small size, wide bandwidth, and low manufacturing cost. Therefore, the invention is suitable for application in a variety of mobile communication devices or the IOT.

Note that the above element sizes, element shapes, and frequency ranges are not limitations of the invention. An antenna designer can fine-tune these settings or values according to different requirements. It should be understood that the antenna structure of the invention is not limited to the configurations of FIGS. 1 and 2. The invention may merely include any one or more features of any one or more embodiments of FIGS. 1 and 2. In other words, not all of the features displayed in the figures should be implemented in the antenna structure of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna structure, comprising:

a ground element;

a first radiation element, coupled to a first grounding point on the ground element;

a second radiation element, having a feeding point, wherein the second radiation element is adjacent to the first radiation element;

a third radiation element, coupled to a second grounding point on the ground element, wherein the third radiation element is adjacent to the second radiation element; and a nonconductive support element, wherein the first radiation element, the second radiation element, and the third radiation element are disposed on the nonconductive support element;

wherein the second radiation element is at least partially surrounded by the first radiation element, and the third radiation element is at least partially surrounded by the second radiation element.

2. The antenna structure as claimed in claim 1, wherein the second radiation element is substantially positioned between the first radiation element and the third radiation element.

3. The antenna structure as claimed in claim 1, wherein the first radiation element substantially has an L-shape and comprises a wide portion and a narrow portion, and the narrow portion is coupled through the wide portion to the first grounding point.

4. The antenna structure as claimed in claim 1, wherein the second radiation element substantially has a meandering shape and further comprises a first terminal widening portion.

5. The antenna structure as claimed in claim 1, wherein the third radiation element substantially has an inverted U-shape and further comprises a second terminal widening portion.

6. The antenna structure as claimed in claim 1, wherein a first coupling gap is formed between the second radiation element and the first radiation element, a second coupling gap is formed between the third radiation element and the second radiation element, and a width of each of the first coupling gap and the second coupling gap is from 0.5 mm to 3 mm.

7. The antenna structure as claimed in claim 1, wherein the antenna structure covers a first frequency band, a second frequency band, and a third frequency band, the first frequency band is from 800 MHz to 860 MHz, the second frequency band is from 1710 MHz to 2170 MHz, and the third frequency band is from 2500 MHz to 2690 MHz.

8. The antenna structure as claimed in claim 7, wherein a length of the first radiation element is substantially equal to 0.25 wavelength of the first frequency band.

9. The antenna structure as claimed in claim 7, wherein a length of the second radiation element is substantially equal to 0.25 wavelength of the second frequency band.

10. The antenna structure as claimed in claim 7, wherein a length of the third radiation element is substantially equal to 0.25 wavelength of the third frequency band.

* * * * *